US009800047B2

(12) United States Patent
Forcht

(10) Patent No.: US 9,800,047 B2
(45) Date of Patent: Oct. 24, 2017

(54) SUPPLY MODULE AND MODULE CHAIN

(75) Inventor: Ralf Forcht, Wendlingen (DE)

(73) Assignee: FESTO AG & CO. KG, Esslingen (DE)

( * ) Notice: Subject to any disclaimer, the term of this patent is extended or adjusted under 35 U.S.C. 154(b) by 750 days.

(21) Appl. No.: 14/359,950

(22) PCT Filed: Nov. 24, 2011

(86) PCT No.: PCT/EP2011/005909
§ 371 (c)(1),
(2), (4) Date: May 22, 2014

(87) PCT Pub. No.: WO2013/075729
PCT Pub. Date: May 30, 2013

(65) Prior Publication Data
US 2014/0312703 A1 Oct. 23, 2014

(51) Int. Cl.
*H02J 1/00* (2006.01)
*H02J 3/00* (2006.01)
*F15B 13/08* (2006.01)

(52) U.S. Cl.
CPC ............ *H02J 1/00* (2013.01); *F15B 13/0839* (2013.01); *F15B 13/0857* (2013.01); *Y10T 307/696* (2015.04)

(58) Field of Classification Search
CPC ..... F15B 13/0853; F15B 13/0839; H02J 1/00; Y10T 307/696
See application file for complete search history.

(56) References Cited

U.S. PATENT DOCUMENTS 4,654,539 A * 3/1987 Moller .................. G05B 11/14 307/118
6,213,153 B1 * 4/2001 Hayashi .............. F15B 13/0817 137/560
8,375,986 B2 * 2/2013 Miyazoe ............ F15B 13/0825 137/560
2009/0045367 A1 2/2009 Lee et al.
2009/0307405 A1 * 12/2009 Ottliczky ............ F15B 13/0853 710/305
2011/0051325 A1 * 3/2011 Kawasaki ................ H02J 3/06 361/631

FOREIGN PATENT DOCUMENTS

WO WO2007042090 4/2007

* cited by examiner

*Primary Examiner* — Fritz M Fleming
*Assistant Examiner* — Rasem Mourad
(74) *Attorney, Agent, or Firm* — Hoffman & Baron, LLP

(57) ABSTRACT

A supply module for insertion into a module chain of functional modules mounted side by side along a concatenation axis and electrically connected to one another in a Z-linkage includes a first coupling surface having a plurality of electric input terminals, and a second coupling surface having a plurality of electric output terminals, wherein a specifiable assignment of the input terminals to the output terminals is provided, and wherein at least one input terminal is designed as a supply input for feeding in a supply voltage from an upstream functional module and at least one output terminal is designed as a supply output for transferring the supply voltage to a downstream functional module. An additional input for feeding in an additional supply voltage and an output terminal are provided for transferring the additional supply voltage to at least one functional module arranged downstream along the concatenation axis.

7 Claims, 2 Drawing Sheets

SUPPLY MODULE AND MODULE CHAIN

This application claims priority based on an International Application filed under the Patent Cooperation Treaty, PCT/EP2011/005909, filed Nov. 24, 2011.

BACKGROUND OF THE INVENTION

The invention relates to a supply module for insertion into a module chain of functional modules mounted side by side along a concatenation axis and electrically connected to one another in a Z-linkage, with a first coupling surface, which is designed for fitting to a functional module arranged upstream along the concatenation axis and which has a plurality of electric input terminals, and with a second coupling surface, which is designed for fitting to a functional module arranged downstream along the concatenation axis and which has a plurality of electric output terminals, wherein a specifiable assignment of the input terminals to the output terminals is provided, and wherein at least one input terminal is designed as a supply input for feeding in a supply voltage from an upstream functional module and at least one output terminal is designed as a supply output for transferring the supply voltage to a downstream functional module. The invention further relates to a module chain comprising at least one supply module.

From WO 2007/042090 A1, a module system is known which comprises a head module having at least one terminal for an external bus signal on an external bus, at least one pneumatic supply port, an electric supply terminal and, each emerging at the same side, a serial bus interface for an internal bus, an electric supply interface, a multipolar interface and a pneumatic supply interface. The module system further comprises at least one functional module with, each extending from one side to the opposite side and connected to the corresponding interface of the head module, an internal serial bus line, electric supply lines, electric multipolar lines and pneumatic supply lines. The head module converts serial bus signals into multipolar signals for output to the multipolar interface. The functional module selectively branches off at least one of the multipolar lines and implements with a signal carried thereon a pneumatic or an electric function or both a pneumatic and an electric function.

SUMMARY OF THE INVENTION

The invention is based on the problem of providing a supply module and a module chain which allow a regional, presettable supply of functional modules with an electric voltage which can be provided independently of the supply voltage.

According to a first aspect of the invention, this problem is solved for a supply module of the type referred to above by the features of claim 1. According to this, an additional input for feeding in an additional supply voltage from an electric energy source is provided, and an output terminal is provided as an additional output for transferring the additional supply voltage to the functional module arranged downstream along the concatenation axis. At the additional input, which is preferably located away from the first and second coupling surfaces on the supply module, an additional supply voltage can be fed into the supply module, and this can then be used for a presettable number of downstream functional modules which can be fitted along the concatenation axis. The additional supply voltage can have characteristics which are different from those of the supply voltage. The additional supply voltage may for example have a higher or lower value than the supply voltage. In addition or as an alternative, the electric energy source provided for delivering the additional supply voltage may be designed in a different way, in particular protected electrically by different means, to the electric energy source providing the supply voltage. It may furthermore be provided in addition or alternatively that the additional supply voltage is altered in different operating conditions of the module chain into which the supply module can be looped, or that the additional supply voltage is temporarily disconnected. In this way, the functional modules which are coupled to the supply module and to which the additional supply voltage is applied can be influenced.

Advantageous further developments of the invention are specified in the dependent claims.

It is expedient if a switching means which is designed for optionally switching between a first conductor branch which connects the input terminal to the output terminal and a second conductor branch which connects the output terminal to the additional input is looped between at least one input terminal and an associated output terminal. With the switching means, it can be determined whether there is a direct connection between the input terminal and the output terminal or whether the input terminal is disconnected from the output terminal and electric energy is to be fed in and transferred to the associated output terminal with the aid of the additional input. The switching means is preferably a mechanical switch which is manually set to the respective switching position when the supply module is configured. This mechanical switch can in particular be designed as a DIP (dual inline package) switch, as an arrangement of a plurality of connector studs which are electrically connectable to one another by means of connecting parts (jumper), or as a wire spring element (hairpin contact).

Module chains are typically not assembled by the end user, who may for example wish to control a pneumatically operated device, but at the manufacturer's company, which is responsible for the production of the functional modules and the supply modules. As the module chains are usually assembled and installed in accordance with a predetermined specification, the number of functional modules to which an additional supply voltage which is different from the supply voltage or at least influenced independently therefrom is applied with the aid of a supply module is determined as well. The respective switching means are therefore set to the desired switching position when the module chain is put together. The switching means are preferably no longer accessible after the assembly of the module chain and can therefore not be modified either mechanically or electrically or electronically. This ensures that the configuration of the module chain which is relevant to the safety of the intended application is maintained in the operating state.

It is advantageous if a transmission means designed for a galvanically isolated transfer of a switching signal which can be provided at the input terminal to the output terminal is assigned to the second conductor branch. The transmission means ensures that the supply voltage and the additional supply voltage do not influence one another, because this could result in undesirable operating conditions for the functional module.

In a further development of the invention, it is provided that the transmission means comprises a sending means for sending out a coupling signal as a function of the switching signal which can be provided at the input terminal and a receiving means for receiving the coupling signal, wherein the receiving means includes a switching means selectable by the coupling signal and designed for opening an electric path between the output terminal and the additional input. The sending means and the receiving means are designed such that a switching signal, which may in particular be a change of the electric potential at the input terminal, is transmitted as a coupling signal. The switching means assigned to the receiving means ensures, on the arrival of the coupling signal, the opening of the electric path between the output terminal and the additional input, so that, for example, an electric current can flow from the output terminal to the additional input on the arrival of a coupling signal. The coupling signal may for example be present in the form of an electromagnetic wave or a magnetic field.

The sending means is preferably looped electrically between the supply input and the associated input terminal. In this way, a supply of the sending means with electric energy is always ensured irrespective of the additional supply voltage. Moreover, the arrangement ensures a simple transfer of a switching signal, which can be applied to the input terminal and which is transmitted from a control module located in particular at the start of the module chain, through the functional modules to the supply module. The switching signal is preferably designed as an electric potential difference relative to the supply voltage applied to the input terminal, so that, if the switching signal is present at the input terminal, there is an electric potential difference between the supply terminal and the input terminal, resulting in a flow of current between the supply terminal and the input terminal and thus to the sending-out of a coupling signal.

In a further variant of the invention, the transmission means comprises an optocoupler and/or a capacitive coupler and/or an inductive coupler. In an optocoupler, the sending means is designed for emitting electromagnetic waves, in particular in the range of visible light and/or in the range of ultraviolet radiation and/or in the range of infrared radiation, while the receiving means of an optocoupler is configured for the reception of the electromagnetic waves and, in the presence of a presettable signal level of the transmitted coupling signals, for the selection of the assigned switching means, with the aid of which the electric path between the output terminal and the additional input can be opened or blocked.

It is expedient if at least one input terminal is electrically connected to the associated output terminal in a direct, uninterrupted manner. This allows for a direct transmission of a switching signal from the input terminal to the output terminal.

According to a second aspect, the problem of the invention is solved for a module chain of functional modules electrically connected to one another in a Z-linkage along a concatenation axis by providing that a supply module according to any of claims 1 to 8 is inserted between two adjacent functional modules. With the aid of such a supply module, a predeterminable region of the module chain, in particular one or more functional modules directly mounted side by side with the supply module, can be supplied with an additional supply voltage which is different from the supply voltage and/or can be influenced independently.

In the module chain, a number of functional modules which are located downstream of the supply module and which are provided for an application of the additional supply voltage which can be introduced into the supply module can preferably be preset by opening a corresponding number of electric connections between the additional input and output terminals serving as additional outputs. In this way, the supply module can be adapted to the requirements of the downstream functional modules, for example by applying the additional supply voltage to two downstream functional modules and applying the supply voltage looped through the supply module to the remaining functional modules. For this purpose, it is expedient if an electric path for the supply voltage extends through the functional modules arranged along the concatenation axis.

BRIEF DESCRIPTION OF THE DRAWINGS

An advantageous embodiment of the invention is illustrated in the drawing, of which.

DETAILED DESCRIPTION OF THE PREFERRED EMBODIMENTS

Figure 1:
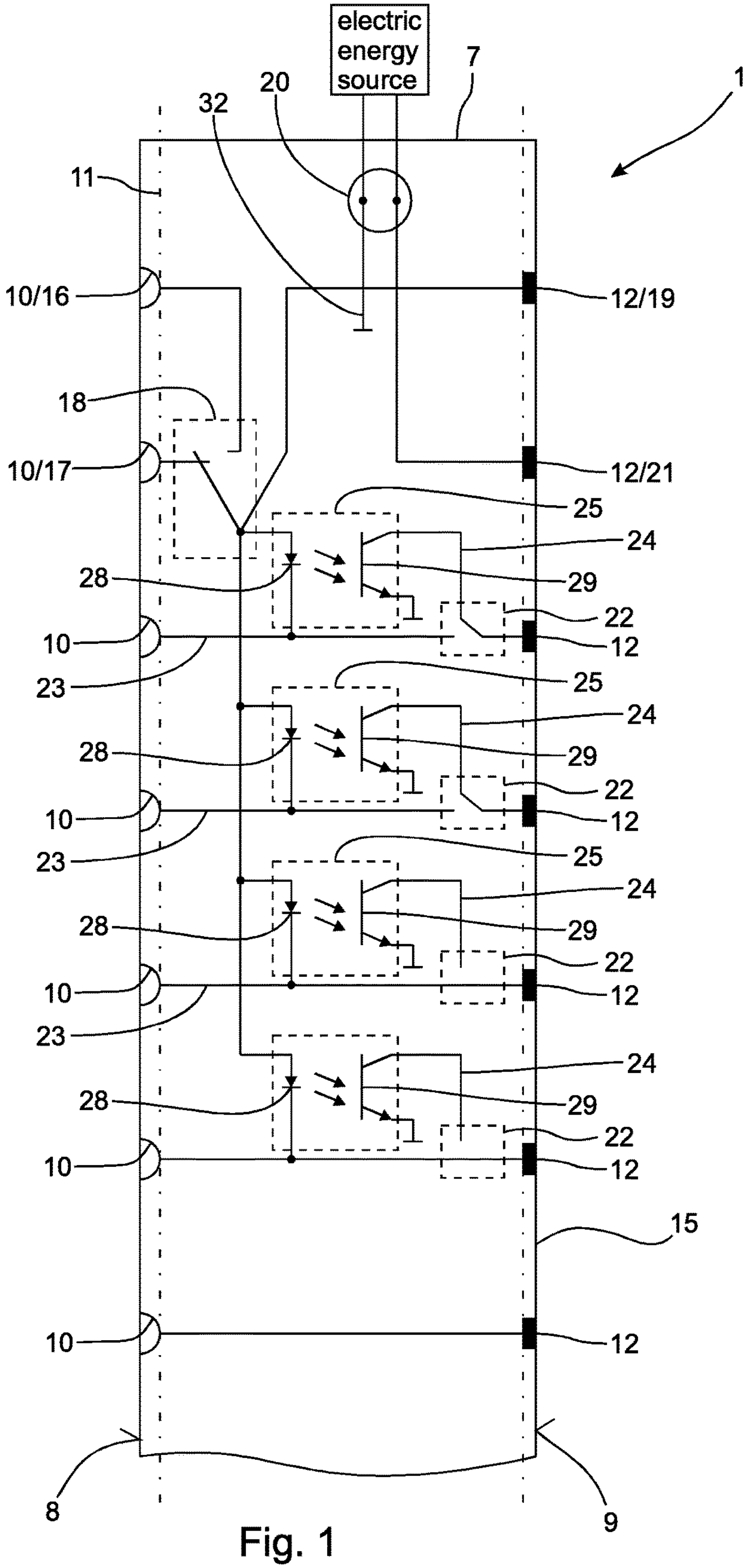
FIG. 1 is a schematic circuit diagram of a supply module.
Figure 2:
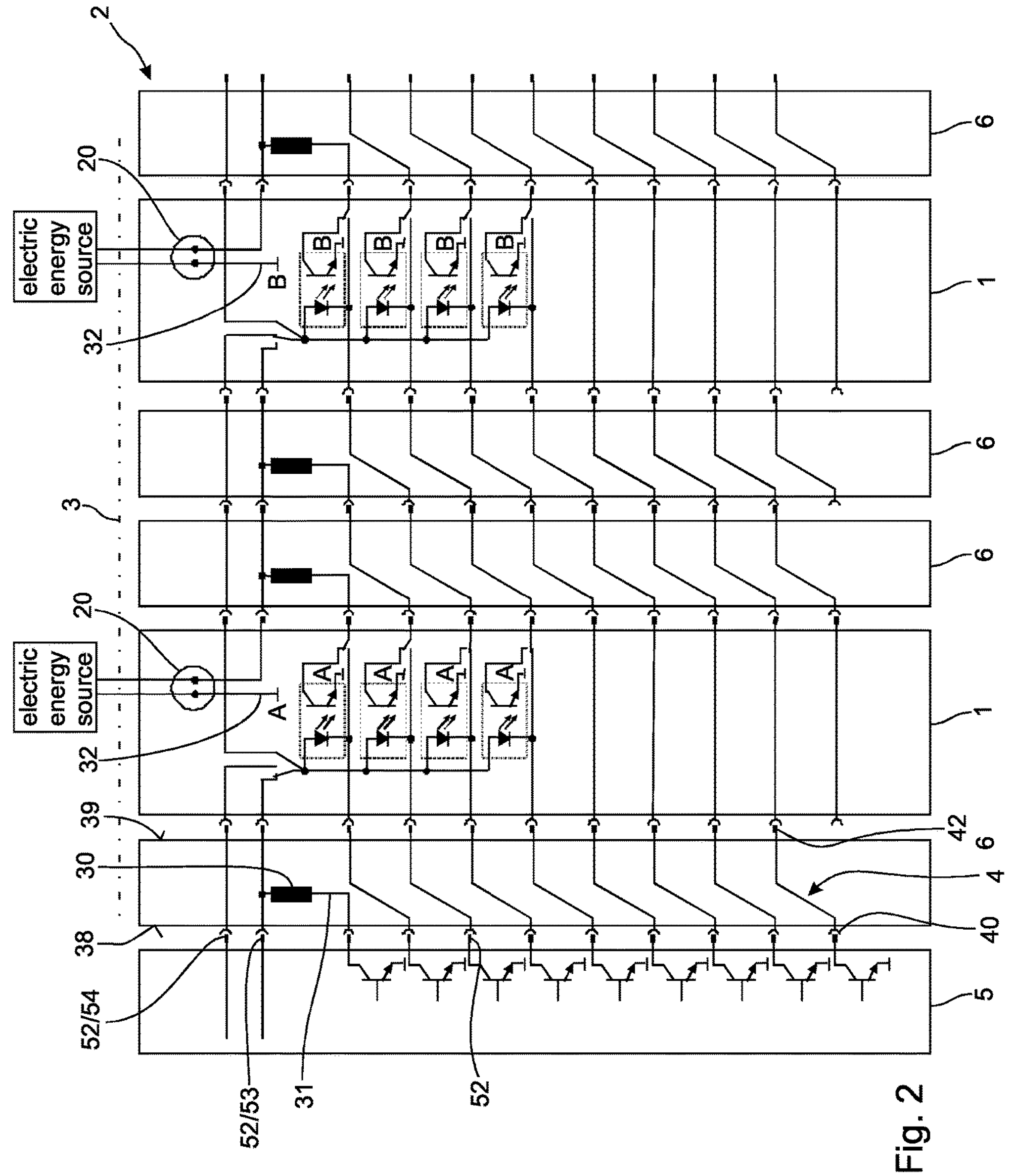
FIG. 2 shows a module chain with a control module, a plurality of functional modules and a plurality of supply modules.

FIG. 1 diagrammatically illustrates a supply module 1 designed for insertion into a module chain 2 shown in greater detail in FIG. 2. The module chain 2 comprises a plurality of functional modules 5, 6 mounted side by side along a concatenation axis 3 and electrically connected to one another in a Z-linkage 4.

The embodiment of the supply module 1 illustrated in FIG. 1 has a cubic housing 7 on which two coupling surfaces 8, 9 are formed on opposite surfaces. The first coupling surface 8 is designed for fitting to a functional module 5 or 6 located upstream along the axis of concatenation 3. In the illustrated embodiment, the coupling surface 8 is flat and has a plurality of electric input terminals 10. The input terminals 10 are preferably arranged along a straight line 11, in particular equidistant in a presettable reference grid. The input terminals 10 may for example be designed as metallic or metallised contact surfaces and make available electric potentials and/or electric currents to the supply module 1. On the second coupling surface 9, which is oriented opposite the first coupling surface 8 and which is likewise flat in the illustrated embodiment, the supply module 1 further comprises a plurality of electric output terminals 12. The second coupling surface 9 is designed for fitting to a functional module 5 or 6 located downstream along the axis of concatenation 3. The output terminals 12 on the second coupling surface 9 are preferably arranged opposite the input terminals 10, in particular along a straight line 15 in a presettable reference grid. In the illustrated embodiment of the supply module 1, a corresponding output terminal 12 is therefore assigned to each input terminal 10.

In the illustrated embodiment, two of the input terminals are designed as first and second supply inputs 16, 17, which can be used for feeding in a supply voltage from an upstream functional module 5 or 6. As FIG. 2 shows, only one of the two supply terminals 16, 17 is used in each case, while the other supply input 16, 17 remains unassigned. For a selection between the two supply inputs 16, 17, a switching means 18, which in the illustrated embodiment is a mechanical, manually operated change-over switch, is provided in the supply module 1. With this switching means 18, the respective supply module 1 is configured in accordance with the supply voltage to be provided and reliably retains this set configuration if the switching means 18 is designed suitably. The switching means 18 in each case establishes an electric connection between the first or second supply input 16, 17 and an output terminal 12 which is designed as a supply output 19 arranged opposite the first supply input 16. An output terminal 12 arranged to correspond to the second supply input 17 is electrically connected to an additional input 20 and therefore serves as an additional output 21. This additional output 21 is provided for a transfer of an electric additional supply voltage made available at the additional input 20 to the functional module 5 or 6 located downstream along the concatenation axis 3 and possibly to further functional modules 5, 6.

The additional input 20 is preferably provided at a lateral surface of the housing 7 and is electrically connected to an additional electric energy supply source which is not shown in detail and which is preferably independent of a likewise not illustrated electric energy supply source designed for providing the supply voltage for one of the supply inputs 16, 17.

In the illustrated embodiment, switching means 22 designed for optionally switching between a first conductor branch 23, which allows a direct connection between the input terminal 10 and the output terminal 12, and a second conductor branch 24, which connects the output terminal 12 to the additional input 20, are looped in between some of the input terminals 10 and the output terminals 12. The switching means 22 is preferably designed as a mechanical, manually operated change-over switch. If the switching means 22 is in a first switching position, a direct electric coupling between the input terminal 10 and the output terminal 12 is ensured. If the switching means 22 is in a second switching position, the first conductor branch 23 is interrupted and current can only flow between the additional input 20 and the associated output terminal 12. In order to ensure that, even in this switching state of the switching means 20, the current flow depends on a switching signal available at the associated input terminal 10, a transmission means 25 is assigned to the second conductor branch 24. The transmission means 25 is arranged for a galvanic isolation between a switching signal which can be made available at the input terminal 10 and the additional supply voltage which can be made available at the output terminal as a result of the switching signal. In the illustrated embodiment, the transmission means 25 is designed as an optocoupler and comprises a sending means 28, which may be a light-emitting diode, for sending out a coupling signal as a function of the switching signal available at the associated input terminal 10. The transmission means 25 further comprises a receiving means designed as a light-sensitive phototransistor 29 for receiving the coupling signal; this may be designed such that it opens the electric path between the additional input 20 and the output terminal 12 on the arrival of a coupling signal. This electric path runs via the earth connection between the phototransistor 29 and the additional input 20. In this context, it is advantageous if different chassis earths can be applied to the various additional inputs 20 if several supply modules 1 are used, which is why the designations A and B are used in FIG. 2. By closing this electric path, the electric energy can be diverted from an actuator component 30 of a concatenated valve module 6 to the additional input 20, as shown in greater detail in FIG. 2.

In the present case, the sending means 28 is electrically connected to the switching means 18 in such a way that the supply voltage available at the supply inputs 16, 17 is always applied to it, so that the sending out of a coupling signal can be initiated on the arrival of a switching signal at the associated input terminal 10 irrespective of the additional supply voltage applied to the additional input 20.

The embodiment of the module chain 2 shown in FIG. 2 is provided for the control of fluidic actuators not shown in detail, such as pneumatically or hydraulically operated cylinders, rotary actuators, motors or the like, and for this purpose comprises as a first unit a functional module designed as a control unit 5 as well as a plurality of functional modules designed as valve modules 6, which are arranged on the control unit 5 along the concatenation axis 3. Further functional modules not shown in detail, such as input/output modules for the operation of sensors, may also be provided. On a first coupling surface 38, each of the valve modules 6 has a number of input terminals 40, the arrangement of which matches the arrangement of the output terminals 12 on the supply module 1 and the arrangement of output terminals 52 of the control module 5. As a result, a supply voltage can be provided to the downstream valve module 6 by the control module 5, this being optionally provided via a first or a second supply output 53, 54. Via the further output terminals 52 of the control module 5, the associated valve modules 6 can furthermore be controlled individually by means of switching signals, in particular as a function of a bus signal which is fed into the control module 5 via a bus interface not shown in the drawing.

In the illustrated embodiment, it is provided that a actuator component 30 located in the valve module 6, which actuator component may for example be a solenoid coil of a fluidic switching valve, is looped in an electrically conductive manner between a conductor branch 31, to which the supply voltage can be applied, and the respective first input terminal 10, to which the switching signal of the control module 5 can be applied. Accordingly, in the presence of a switching signal a current can flow from the supply terminal 17 through the actuator components 30 to the input terminal 40 and from there to the control module 5. In order to give a second valve module 6 arranged to adjoin the first valve module 6 the same structure as the upstream valve module 6, a Z-linkage between the output terminals 42 and the input terminals 40 is provided in each of the valve modules 6. In the illustrated embodiment, the input terminals 40 and the output terminals 42 are equally spaced in a presettable reference grid along straight lines not shown in the drawing, input and output terminals which are electrically connected to one another being mutually offset by the reference grid. In contrast, no Z-linkages of the input and output terminals 10, 12 are provided in the two supply modules 1, because in this case there is only a galvanically coupled or isolated transfer of switching signals of the control module 5.

In the module chain 2 shown in FIG. 2, the supply module arranged closer to the control module 5 is provided for supplying the two valve modules 6 located downstream along the concatenation axis 3 with an additional supply voltage which can be applied to the additional input 20. Accordingly, the two output terminals 12 which are electrically connected to the actuator components 30 of the two downstream valve modules 6 are galvanically isolated from the associated input terminals 10 owing to the switching position of the respective switching means 22. If an additional supply voltage is provided at the additional input 20 and a switching signal is present at one of these two valve modules 6, the transmission means only transmits a coupling signal on arrival of the switching signal, owing to the galvanic isolation. As a result of this coupling signal, the phototransistor 29 becomes conductive, and a current can flow from one pole of the additional input 20 through the respective actuator component 30 and the phototransistor 29 to the second pole of the additional input 20.

All switching signals looped in a galvanically coupled way through the supply module 1 located closer to the control module 5 pass through the two downstream valve modules 6 without being affected and can, depending on the switching position of the available switching means 22, be transferred while being galvanically either coupled or decoupled. The galvanically decoupled switching signals can be transferred to the associated valve modules 6, of which only one is shown in the drawing, with a second additional supply voltage.

The invention claimed is:

1. A supply module for insertion into a module chain of functional modules mounted side by side along a concatenation axis and electrically connected to one another in a Z-linkage, the supply module comprising:

- a first coupling surface, which is designed for fitting to a functional module arranged upstream along the concatenation axis and which has a plurality of electric input terminals;
- a second coupling surface, which is designed for fitting to a functional module arranged downstream along the concatenation axis and which has a plurality of electric output terminals, wherein a specifiable assignment of the input terminals to the output terminals is provided, and wherein at least one input terminal is designed as a supply input for feeding in a supply voltage from an upstream functional module and at least one output terminal is designed as a supply output for transferring the supply voltage to a downstream functional module;
- an additional input for feeding in an additional supply voltage from an electric energy source;
- an additional output for transferring the additional supply voltage to at least one functional module arranged downstream along the concatenation axis; and
- a change over switch for optionally switching between a first conductor branch which connects the input terminal to the output terminal and a second conductor branch which connects the output terminal to the additional input, the change over switch being looped between at least one input terminal and an associated output terminal.

2. A supply module according to claim 1, further comprising a coupler selected from the group consisting of an optocoupler, a capacitive coupler and an inductive coupler, the coupler being assigned to the second conductor branch for a galvanically isolated transfer of a switching signal provided at the input terminal to the output terminal.

3. A supply module according to claim 2, wherein the coupler comprises a light emitting diode for sending out a coupling signal as a function of the switching signal provided at the input terminal and a light sensitive photo transistor for receiving the coupling signal and for opening an electric path between the output terminal and the additional input.

4. A supply module according to claim 3, wherein the light emitting diode is looped electrically between the supply input and an associated input terminal.

5. A supply module according to claim 1, wherein at least one input terminal is electrically connected to the associated output terminal in a direct, uninterrupted manner.

6. A module chain comprising a supply module and a plurality of functional modules electrically connected to one another in a Z-linkage, the supply module being inserted between two adjacent functional modules, and a number of functional modules being connected downstream of the supply module, wherein the supply module comprises:

- a first coupling surface, which is designed for fitting to a functional module arranged upstream along the concatenation axis and which has a plurality of electric input terminals;
- a second coupling surface, which is designed for fitting to a functional module arranged downstream along the concatenation axis and which has a plurality of electric output terminals, wherein a specifiable assignment of the input terminals to the output terminals is provided, and wherein at least one input terminal is designed as a supply input for feeding in a supply voltage from an upstream functional module and at least one output terminal is designed as a supply output for transferring the supply voltage to a downstream functional module;
- an additional input for feeding in an additional supply voltage from an electric energy source; and
- an additional output for transferring the additional supply voltage to at least one functional module arranged downstream along the concatenation axis, and wherein the number of functional modules connected downstream of the supply module are preset by opening a corresponding number of electric connections between the additional input and output terminals serving as additional outputs.

7. A module chain according to claim 6, wherein an electric path for the supply voltage extends through the functional modules arranged along the concatenation axis.

* * * * *